May 23, 1967     B. J. VEILLEUX     3,321,045
BRAKE LINING SENSING DEVICE
Filed April 11, 1966
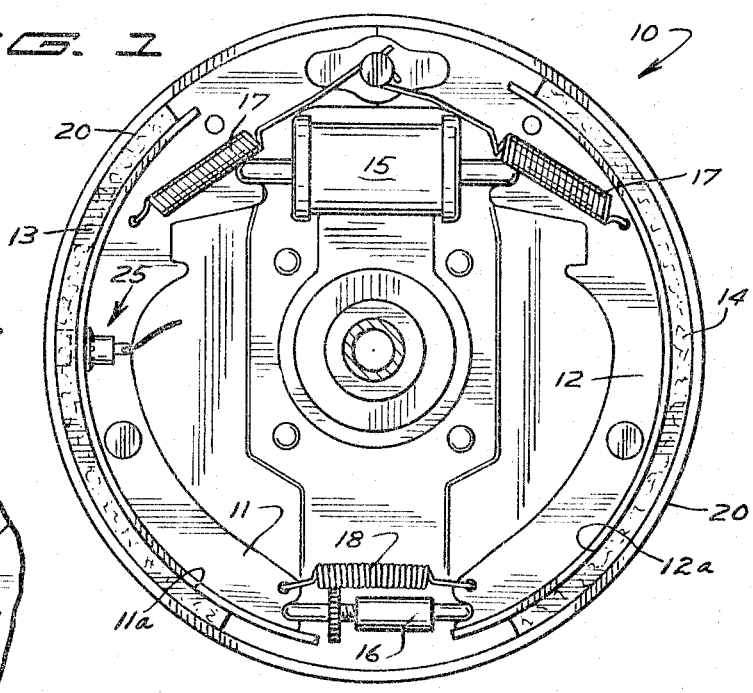
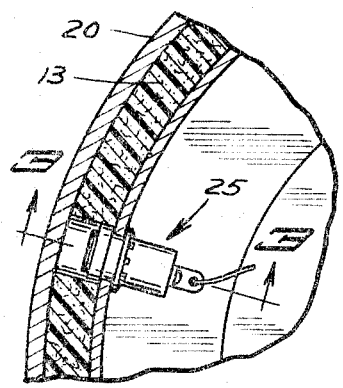
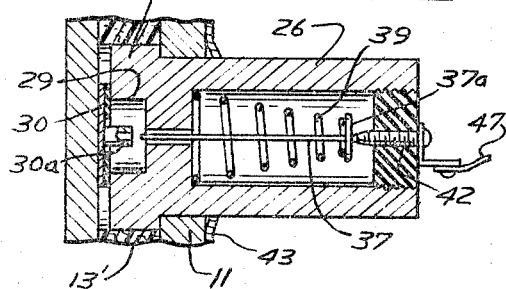
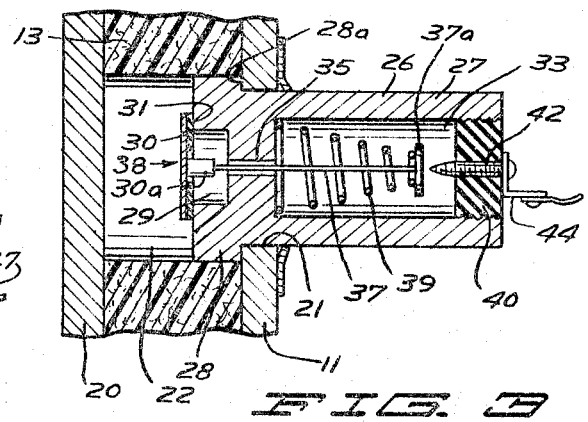
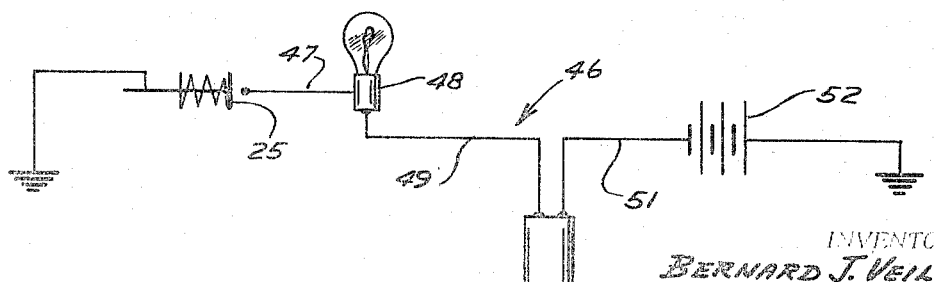
INVENTOR.
BERNARD J. VEILLEUX

United States Patent Office 3,321,045
Patented May 23, 1967

3,321,045
BRAKE LINING SENSING DEVICE
Bernard J. Veilleux, 6608 Penn Ave. S.,
Minneapolis, Minn. 55423
Filed Apr. 11, 1966, Ser. No. 541,643
3 Claims. (Cl. 188—1)

The invention herein relates to an improvement in a brake lining sensing device.

It is an object of the invention herein to indicate the condition of a brake lining when the lining has been worn down to a point at which it requires replacement.

It is another object of the invention herein to provide a simple and integrally constructed device which will actuate a signal when a brake shoe lining has been worn down to a predetermined degree.

It is more specifically an object of this invention to provide a cartridge type of device carried by a brake shoe and being partially recessed into the brake shoe lining, said cartridge being included within a circuit to provide a signal when the brake lining has been worn down to a given point.

These and other objects and advantages of the invention will be set forth in the following description made in connection with the accompanying drawings in which like reference characters refer to similar parts throughout the several views and in which:

FIG. 1 is a view in side elevation showing the device comprising the invention herein in operating position;

FIG. 2 is a broken view in section of a portion of FIG. 1 on an enlarged scale showing the device;

FIG. 3 is a broken view in section on a further enlarged scale taken on line 3—3 of FIG. 2 with the mechanism of the device shown in one operating condition;

FIG. 4 is a view similar to that of FIG. 3 showing another operating condition of the device; and FIG. 5 is a wiring diagram.

Referring to the drawings, the numeral 10 refers generally to a conventional braking apparatus for an automotive vehicle.

Said braking apparatus comprises a pair of brake shoes 11 and 12 which are mounted in a conventional manner and respectively have secured to the outer flange surface portions 11a and 12a brake shoe linings 13 and 14. For the operation of said brake shoes there are provided the cylindrical members 15 and 16 and the retracting springs 17 and 18.

Said brake shoes are positioned to be within a brake drum 20 for engagement therewith.

The device comprising the invention herein is indicated generally by the numeral 25.

Said device in the preferred embodiment here presented comprises a housing 26 which will be formed of an electrically conductive material and is here shown as being cylindrical in form with a lower body portion 27 and an upper body portion 28 of increased diameter formed to have an underlying annular shoulder 28a.

Said upper portion 28 of said housing has an open-ended chamber or recess 29 within the upper portion thereof. Said lower portion of said housing has an open-ended chamber or recess 33 therein of some depth. A passage 35 runs between said recessed portions 29 and 33 connecting the same. Said chambers are axially aligned.

Disposed in said housing is a circuit triggering mechanism 38 comprising a flat plate-like head portion 30 preferably formed of copper or brass. Underlying said head portion is a flat sealing washer or gasket 31.

Depending from said head portion 30 and being removably secured at one end thereto is a rod 37. In the present embodiment, said head portion is shown having a depending hub or sleeve portion 30a receiving therein the adjacent end portion of said rod 37. Said rod will be removably secured within said hub portion by a material having a low melting point such as solder. At its other or lower end, said rod carries a flat button-like electrical contact 37a.

Said head portion 30 will extend downwardly into the recess 33 and holding said mechanism in position is an electrically conductive compressed coil spring 39 bearing at one end against the upper end of said recess 33 and at its other end against said contact 37a is carried on the rod 37.

Closing the open end of said recess or chamber 33 is a nonconductive or insulating plug 40. Extending through said plug 40 and carried thereby is an electrical contact 42 having a tapered or pointed inner end portion or contact point, and secured to its outer end portion is an angled contact 44 having a wire or line 47 running therefrom.

For installation into operating position, the flange portion 11a of the brake shoe 11 will be bored at 21 to receive the lower portion 27 of said housing 26 therethrough with the shoulder 28a bearing against the outer surface of said flange portion 11a.

A circular spring type lock washer 43 will be disposed about the lower body portion of said housing 26 and will be slid upwardly to bear against the underside of said flange 11a.

The brake lining 13 will be bored as at 22 to accommodate the upper portion 28 of said housing member 26.

It will be understood that said upper portion 28 will extend upwardly into the brake lining just to the point at which the brake lining should be replaced. More specifically when the brake lining has worn down to the point that the brake drum will engage and contact said plate member 30, there will not be sufficient thickness of brake lining left for any substantial wear.

With reference to the circuit 46 indicatel in FIG. 5, the device 25 is grounded through its housing to the chassis of the motor vehicle by being seated in the brake shoe and engaging the sides of the bore or aperture 21. A line 47 runs from the contact 44 to a signal 48 which is shown here as a visual signal but which may be an audio signal or a combination of both. The signal will be of a conventional type mounted in the dashboard of the motor vehicle and requires no further description in connection with the invention as claimed herein. Said signal in turn is hooked up to the ignition switch 50 by a line 49 and said ignition switch will be connected to the vehicle battery 52 by a line 51.

Operation

The device herein preferably is mounted for use either on a new vehicle or at a time when the brake shoes are being re-lined. The device may be mounted on a brake shoe on each of the wheels of the vehicle or just on the wheel where the brake lining receives the hardest wear.

The boring operating with respect to the bore 22 in the brake lining and the bore 21 in the brake shoe is readily accomplished. The bore in the brake lining represents a counter-bore.

The device 25 is pre-fabricated as a cartridge and is relatively simple to install for anyone appropriately trained as an automobile mechanic. The simple circuit indicated will serve the purpose required and represents a permanent installation. The device 25 will be replaced each time the brake shoe bearing the same is re-lined. It will be understood that the circuit will include each brake shoe bearing the device 25.

The device 25 is shown in FIG. 3 in connection with a new brake lining. In FIG. 4, the brake lining 11' is shown in worn condition ready for replacement and the drum 20 is in engagement with the plate member 30.

The friction of the brake drum running over said plate member 30 will generate sufficient heat to melt the solder anchoring the rod 37 within the hub or sleeve 30a. The pressure of the spring 39 then forces the rod axially into engagement with the contact 42 to close the electrical circuit 46 and actuate the signal 48.

The operator of the vehicle will observe and be alerted by said signal 48 to replace his brake linings.

Thus it is seen that I have provided a simply constructed and simply installed brake lining sensing device which promptly and efficiently alerts the operator of an automotive vehicle of the need for replacing brake shoe linings.

It will of course be understood that various changes may be made in the form, details, arrangement and proportions of the parts, without departing from the scope of applicant's invention which, generally stated, consists in a device capable of carying out the objects above set forth, in the parts and combinations of parts disclosed and defined in the appended claims.

What is claimed is:
1. A brake lining sensing device having in combination,
a cartridge comprising
an electrically conductive housing,
said housing having a chamber therein,
a plate member overlying the upper end portion of said housing,
said housing having a passage running from said plate member to said chamber,
a rod extending from said plate member into said chamber,
heat releasable means securing one end of said rod to said plate member,
an electrically conductive member carried at the other end of said rod,
an electrical contact member insulated from said housing extending from within said chamber to the outer side of said housing, and
electrically conductive resilient means engaging said housing and said conductive member and urging said conductive member in the direction of said electrical contact member whereby when said rod is released from said plate member, said conductive member engages said contact member.
2. The structure set forth in claim 1,
a vehicle brake mechanism comprising
a nonrotating brake shoe,
a brake lining carried on said shoe,
a rotating drum for engagement with said lining,
means securing said cartridge to said shoe,
said lining having a recess in the underside thereof, and
said plate member of said cartridge projecting into said recess whereby when said brake lining wears down to the point of said plate member, said drum frictionally engages said plate member and generates sufficient heat to release said rod from said plate member.
3. The structure set forth in claim 1, wherein,
an upper portion of said housing having an enlarged transverse dimension forming an underlying shoulder,
a brake shoe, said brake shoe having a bore therein to receive said cartridge and support said shoulder,
means removably securing said cartridge to said brake shoe,
a brake lining overlying said brake shoe and having a recess therein to receive said upper portion of said housing,
an electical circuit including a signal means,
said electrical contact being in circuit with said signal means, and
a brake drum having engagement with said housing when said brake lining becomes sufficiently worn and the engagement of said brake drum with said housing generates sufficient heat to release said rod from said plate member.

No references cited.

DUANE A. REGER, *Primary Examiner.*